United States Patent [19]

Bonacci et al.

[11] 4,404,435
[45] Sep. 13, 1983

[54] TELEPHONE LOCK

[76] Inventors: John J. Bonacci; Theresa S. Bonacci, both of 368 True Hickory Dr., Rochester, N.Y. 14615

[21] Appl. No.: 328,379

[22] Filed: Dec. 7, 1981

[51] Int. Cl.³ .............................................. H01M 1/66
[52] U.S. Cl. ............................ 179/189 R; 179/189 D; 179/159
[58] Field of Search ............... 179/189 R, 189 D, 159, 179/160, 161, 162, 163, 164; 70/DIG. 72; 200/61.58 R, 42 R, 44

[56] References Cited

U.S. PATENT DOCUMENTS

| | | | |
|---|---|---|---|
| 3,358,087 | 12/1967 | Von Stein | 179/189 D |
| 3,480,720 | 11/1969 | Aiba | 179/159 |
| 4,022,992 | 5/1977 | Kennedy | 179/189 D |

Primary Examiner—G. Z. Rubinson
Assistant Examiner—Robert Leu
Attorney, Agent, or Firm—Cumpston & Shaw

[57] ABSTRACT

A lock for securing a telephone instrument against unauthorized use includes a key-operated cylinder extending through a wall of the housing of the telephone instrument and including a cam movable between locked and unlocked positions for engaging the line switch of the telephone instrument in the locked position and maintaining the line switch in a disconnect position so long as the lock remains in the locked position.

5 Claims, 3 Drawing Figures

TELEPHONE LOCK

This invention relates in general to telephone locking devices and more particularly to an improved telephone lock for directly engaging the line switch of a telephone instrument to prevent unauthorized use of the instrument.

Devices for securing telephone instruments from unauthorized use while such instruments are unattended have long been known in the art. Such locks have heretofore taken one of two forms, those securing the telephone dial or key pad from use and those for maintaining the plungers of the telephone instrument in a depressed position when the hand set is removed from the cradle. Each of these types of telephone locks suffers from certain disadvantages which render it either readily defeatable, or too expensive to manufacture or cumbersome to use to provide a practical lock.

Examples of locks for engaging the plungers of a telephone may be found in U.S. Pat. Nos. 2,642,659; 3,469,041; 3,598,931; 3,624,317; 3,723,671; 3,823,277 and 3,939,678. Each of the foregoing includes a tab or flange or the like for engaging one or more of the plungers of the telephone instrument for holding the plunger depressed when the hand set is removed from the telephone cradle. Each of the listed patents is directed to a lock which is removably attached to the external surface of the telephone housing and which is therefore likely to be misplaced or lost when not actually in use. U.S. Pat. No. 3,939,678, is an exception, but the lock described therein is nevertheless readily removed from the telephone instrument when in the unlocked condition and therefore is to that extent, insecure.

Further, the telephone locks described in the foregoing patents are in some instances complex and expensive to manufacture, are unsightly when in use and are in various ways readily defeatable.

It is an object of this invention to provide a lock for securing a telephone instrument against unauthorized use which provides increased security over known locks.

It is another object of this invention to provide a telephone lock which is inexpensive to manufacture.

It is yet another object of this invention to provide a telephone lock which is securely fastened to the telephone instrument in both the locked and unlocked conditions.

It is a further object of this invention to provide a telephone lock which is inconspicuous when in use.

Briefly stated and in accordance with a presently preferred embodiment of the invention, a lock for securing a telephone instrument comprises a lock cylinder extending through the housing of the telephone instrument and having a rotatable cam attached thereto within the telephone housing for selectively engaging the line switch of the telephone instrument and for holding the line switch in a disconnected position when the lock cylinder is in the locked position, notwithstanding the removal of the telephone handset from the cradle of the instrument.

It is a feature of the invention that the lock is readily adaptable to a variety of particular types of telephone instruments as are becoming increasingly common as the number of companies manufacturing such instruments increases.

The features of the invention which are believed to be novel are set forth with particularity in the accompanying claims. The foregoing and further objects and advantages of the invention will become more readily appreciated by reference to the following detailed description taken in conjunction with the accompanying drawing in which:

Figure 1:
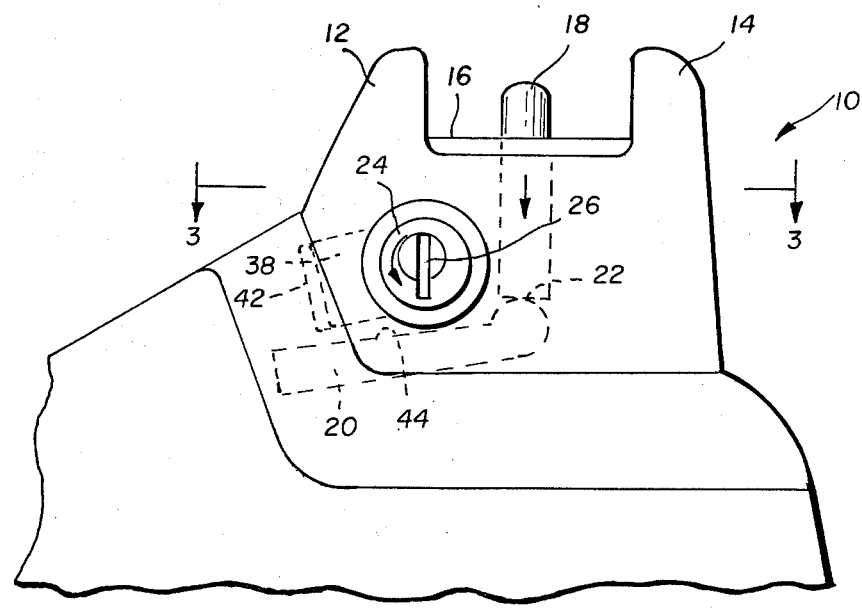
FIGS. 1 and 2 are side views of a portion of a telephone instrument having a lock in accordance with this invention incorporated therein.
Figure 2:
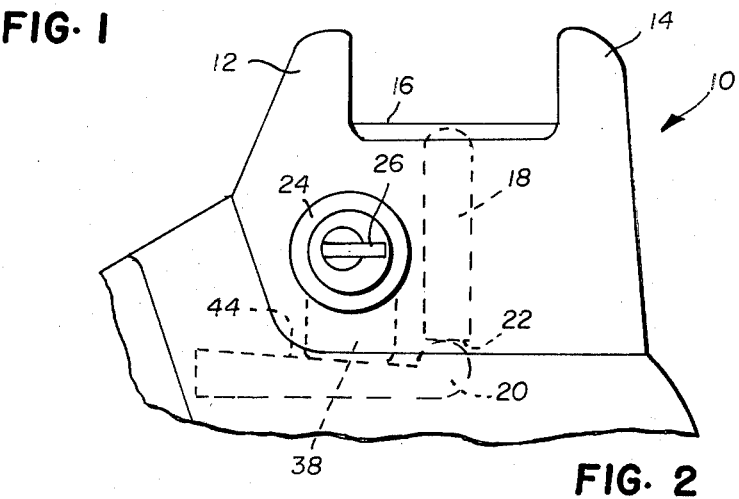
Figure 3:
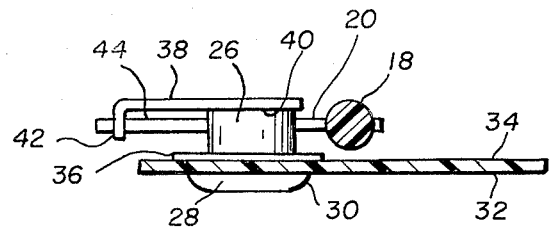
FIG. 3 is a section of a portion of the telephone instrument shown in FIG. 1.

Referring now to FIGS. 1, 2 and 3 wherein like elements of the telephone instrument and telephone lock in accordance with this invention are designated by like reference characters, a portion of a telephone instrument indicated generally at 10 is shown. Telephone 10 includes a cradle portion having first and second upstanding ears 12 and 14 and a lower surface 16, which is one of two cradle portions for receiving the handset of the telephone instrument and holding the handset when the instrument is not in use. Disposed in each cradle portion are plungers, only one of which, plunger 18, is shown in the Figures which are adapted to move freely between depressed (FIG. 2) and extended (FIG. 1) positions as will become clear. An operating arm 20 engages a lower surface 22 of plunger 18. Operating arm 20 is a portion of the line switch assembly of the telephone instrument the remainder of which is not shown. The line switch assembly is operative when the handset is removed from the cradle of the telephone, to allow plunger 18 to move to its extended position as urged by operating arm 20 and to connect the telephone instrument to the telephone line. Conventionally, operating arm 20 is biased to its "off hook" or connected position by spring means associated with the line switch.

It will be appreciated that the telephone instrument shown in FIGS. 1 and 2 is per se conventional and as such forms no particular part of the invention except in combination with the new and improved telephone lock which forms the subject hereof.

The telephone lock itself includes a lock cylinder 24 of per se conventional type which includes a key receiving opening 26 therein which in FIG. 1 is illustrated as a slot for receiving a generally flat key. The invention itself will be understood to encompass other types of lock cylinders including those accepting round keys and the like. Lock 24 includes an outer mounting portion 28 which includes a peripheral flange portion 30 for engaging the outer surface 32 of wall 34 of the telephone instrument housing. Lock 26 is preferably mounted through a hole formed in the side of the telephone instrument and secured therein by retaining clip 36 which engages the inside surface 38 of wall 34.

It will be appreciated that the telephone lock in accordance with this invention is substantially less conspicuous than such locks in accordance with the prior art. Only the very thin outer mounting portion 28 of the lock is visible on the outside surface of the telephone.

Referring particularly now to FIG. 2, the portion of lock cylinder 26 within the telephone instrument may clearly be seen. The lock in accordance with this invention further includes an end plate 38 mounted to end 40 of lock cylinder 26 which end plate is movable between a locked and an unlocked position only when an appropriate key is inserted into slot 26. In order to prevent rotation of the lock cylinder itself within the hole in the telephone housing, it is preferred to provide anchoring means such as an irregularly-shaped hole corresponding to the outside shape of the lock cylinder having a D-shape or the like or including one or more projections anchoring the lock cylinder securely to the wall of the telephone instrument to prevent rotation thereof. Cam portion 42 of end plate 38 extends therefrom towards wall 34 of the telephone instrument a distance sufficient to engage the upper surface 44 of operating arm 20 when the lock is in the locked position. While the embodiment of the invention incorporates separate cam portion 42 of end plate 38, it will be appreciated that other arrangements may be equally well employed within the scope of the invention. For example, plate 38 may be aligned precisely with operating arm 20 thus eliminating the need for any additional cam surface beyond the edge of plate 38 itself. It may be preferable to provide a plate 38 which is somewhat thicker than shown in order to reduce the requirements for precise alignment also eliminating the need for a separate cam surface 42. Cam 42 may be a separate member attached by conventional means to end plate 38 or may be a portion of end plate 38 bent as shown in order to provide a positive locking action as the key is turned between the locked and unlocked positions.

The operation of the telephone lock in accordance with this invention, utilizes the line switch of the telephone instrument itself in order to simulate an "on hook" condition when the lock is actuated notwithstanding that the hand set is removed from the cradle. In this way the telephone instrument remains disconnected from the telephone line by the line switch itself.

The line switch in the telephone instrument may take a variety of forms depending upon the arrangement of the instrument itself, the cradle and the handset. For example, in a wall-type telephone, a cradle may form an extension of the line switch. In this type of telephone instrument, push buttons 18 are not present and the cradle itself is movable between an "on hook" and "off hook" position and is directly connected to the line switch. The structure and operation of the telephone lock in accordance with this invention on such a wall telephone will be readily understood by one skilled in the art to include any of a variety of particular structures sharing the common characteristic that they bear against the line switch or a portion thereof in the locked position to hold the line switch in the locked position notwithstanding the removal of the telephone instrument from the cradle. Accordingly, the invention is widely applicable both to existing telephones and to telephones not yet known so long as they include a line switch having at least one element movable between an "on hook" and "off hook" position which may be engaged by the lock of this invention to maintain the line switch in the "on hook" position notwithstanding the removal of the handset.

While the invention has been described in connection with certain presently preferred embodiments thereof, certain modifications and changes may be made without departing from the true spirit and scope of the invention which is intended to be limited solely by the attached claims.

We claim:

1. In a telephone instrument of the type including a housing, a line switch within said housing movable between a connect position and a disconnect position, means biasing said line switch to said connect position, and handset receiving means outside said housing operative to urge said line switch to said disconnect position when a handset in place on said receiving means, the improvement for securing said instrument comprising:
    a lock having a cylinder extending through said housing; and
    means within said housing connected to said cylinder for engaging said line switch when said cylinder is in a locked position and holding said line switch in said disconnect position when said handset is removed from said receiving means.

2. The lock of claim 1 wherein said handset receiving means comprises a fixed cradle having a plunger engageable by said handset when said handset is in said cradle; and operating arm of said line switch movable between a connect and a disconnect position engaging said plunger within said case and said means engaging said line switch comprises cam means engaging said operating arm for holding said arm in a disconnect position when said handset is removed from said cradle.

3. The lock of claim 1 wherein said handset receiving means comprises a cradle movable between a connect position and a disconnect position by the weight of a handset placed therein and said cradle is coupled to said line switch and said lock comprises means engaging said line switch within said housing for holding said line switch in said disconnect position when said handset is removed from said cradle.

4. The lock of claim 1 wherein said cylinder comprises a key operated cylinder adapted for receiving a key inserted into a portion of said cylinder outside said housing.

5. The lock of claim 2 wherein said cam means comprises means movable between a first position disengaged from said operating arm in both said connect or disconnect positions of said arm and a second locked position for preventing said arm from moving to said connect position when said handset is removed from said cradle.

* * * * *

UNITED STATES PATENT OFFICE
CERTIFICATE OF CORRECTION

PATENT NO. : 4,404,435
DATED : September 13, 1983
INVENTOR(S) : John J. Bonacci and Theresa S. Bonacci It is certified that error appears in the above-identified patent and that said Letters Patent are hereby corrected as shown below:

Claim 2, line 4, after "cradle; and" insert --an--.

Claim 2, line 5, after "said case" insert --;--.

Signed and Sealed this

Ninth Day of October 1984

[SEAL]

Attest:

GERALD J. MOSSINGHOFF

Attesting Officer     Commissioner of Patents and Trademarks